(12) United States Patent
Huang (10) Patent No.: US 8,856,990 B2
(45) Date of Patent: Oct. 14, 2014

(54) AUTOMOBILE NECK PILLOW

(76) Inventor: Lei Huang, Beijing (CN)

(*) Notice: Subject to any disclaimer, the term of this patent is extended or adjusted under 35 U.S.C. 154(b) by 390 days.

(21) Appl. No.: 13/326,241

(22) Filed: Dec. 14, 2011

(65) Prior Publication Data

US 2013/0038111 A1 Feb. 14, 2013

(30) Foreign Application Priority Data

Aug. 11, 2011 (CN) .......................... 2011 1 0228465

(51) Int. Cl.
| | |
|---|---|
| *A47G 9/10* | (2006.01) |
| *B60N 2/44* | (2006.01) |
| *B60N 2/48* | (2006.01) |
| *B60N 2/70* | (2006.01) |

(52) U.S. Cl.
CPC ............ *B60N 2/4415* (2013.01); *B60N 2/4879* (2013.01); *B60N 2/7005* (2013.01)
USPC ........................ 5/636; 5/639; 5/641; 297/397

(58) Field of Classification Search
USPC ........................ 5/636, 639, 641; 297/393, 397
See application file for complete search history.

(56) References Cited

U.S. PATENT DOCUMENTS

| | | | | |
|---|---|---|---|---|
| 3,382,509 | A * | 5/1968 | Lupke et al. ...................... | 5/641 |
| 5,015,036 | A * | 5/1991 | Fergie ............................ | 297/397 |
| 5,964,504 | A * | 10/1999 | Hogan et al. ................... | 297/397 |
| 6,430,764 | B1 * | 8/2002 | Peters ............................... | 5/641 |
| 6,669,300 | B1 * | 12/2003 | Lee ................................. | 297/397 |
| 6,748,615 | B1 * | 6/2004 | Tiedemann ...................... | 5/640 |
| 7,197,781 | B2 * | 4/2007 | Ramsbottom et al. ............ | 5/636 |
| 2009/0309406 | A1 * | 12/2009 | Campa ........................... | 297/397 |

FOREIGN PATENT DOCUMENTS

GB   2194883 A *  3/1988  ............. A47C 27/10

* cited by examiner

*Primary Examiner* — Michael Trettel (57) ABSTRACT

An automobile neck pillow relates to an automobile seat articles technology field, which adopts a key technology truly adapted to human mechanical physiological curves and makes a multiple choice about materials of a core body and an elongated housing and a scientific measurement about shapes and sizes thereof to make the core body and the elongated housing match with each other, wherein the core body is soaked in medical liquids of health care to provide health care and healing to the neck, the core body is attached with a bamboo charcoal fiber cushion, an infra-red cloth, or a negative oxygen ion cloth while integrally being sprayed with perfume, and a brace provided in the elongated housing is mounted between a seat and a head cushion by a longitudinal fixation, a transverse fixation, a combination of longitudinal and transverse fixation, a head-sleeving fixation, or an integral fixation with the head cushion.

12 Claims, 3 Drawing Sheets

AUTOMOBILE NECK PILLOW

BACKGROUND OF THE PRESENT INVENTION

1. Field of Invention

The present invention relates to an automobile seat articles technology field, more particularly to the technology field of a neck pillow providing health care, comfort, safety and convenience, and specifically to an automobile neck pillow technology field.

2. Description of Related Arts

At present, seats in an automobile driving cab do not have neck pillows, leading to shortcomings of lacking comfort, stiffness and ache in neck and neck injury in collision. Thus, based on the applicant's, i.e., the inventor's, professional knowledge, working experience and endless pursuit to career, the applicant applied for a Chinese utility patent on Oct. 13, 2010, whose application number is 201020558203.X and whose title is automobile neck pillow of human mechanics, which has already been patented. But through an experimental application of the utility patent, many existing disadvantages still come out, no matter in the aspect of shape, using effect or application scope. Based on thorough investigation, learning, conclusion, analysis and research about the utility patent and actual state of automobiles, the present invention makes a new successful research by adopting a key technology truly adapted to human mechanical physiological curve and improving the utility patent to a higher stage.

SUMMARY OF THE PRESENT INVENTION

The present invention adopts a key technology truly adapted to human mechanical physiological curves and makes multiple choices about materials of a core body and an elongated housing and a scientific measurement about shapes and sizes thereof based on the Chinese utility patent to make the core body and the elongated housing match with each other, wherein the core body is soaked in medical liquids of health care to provide health care and healing to the neck, the core body is attached with a bamboo charcoal fiber cushion, or an infra-red cloth, or a negative oxygen ion cloth while being wholly sprayed with perfume, a brace provided in the elongated housing is mounted between a seat and a head cushion in a longitudinal fixation, or a transverse fixation, or a combination of longitudinal and transverse fixation, or a head-sleeving fixation, or an integral fixation with the head cushion.

The present invention achieves following purposes, (1) adopting the key technology truly adapted to the human mechanical physiological curves, improving the foregoing patented technology, providing a new product of an automobile neck pillow as a good company for drivers, and serving the drivers, (2) installing the present invention between an upper end of the seat and the head cushion through various installing methods to suit different types of automobiles, which can be easily installed, used, cleaned and maintained, (3) allowing the drivers to drive comfortably and be free from stiffness and ache in the neck, providing obvious health care, and protecting the neck in collision, (4) providing a fragrant driving environment for the drivers to feel fresh and relaxed through spraying perfume integrally, (5) immersing the core body into the medical liquids for heath care to provide health care and healing functions to the neck, (6) attaching the core body with a bamboo charcoal fiber cushion (the bamboo charcoal fiber cushion is for absorbing moisture, eliminating peculiar smells, expelling parasites and improving air quality), a infra-red cloth or a negative oxygen ion cloth (the infra-red cloth and the negative oxygen ion cloth are for improving air quality) to improve the air quality in a driving cab for the driver to feel comfortable, (7) through repeated trials, setting all measurements, such as the shape and size, about the automobile neck pillow to realize a scientific and reasonable designing, a simple and delegate structure, a quick and easy application and a stable and reliable effect, (8) making a multiple choice about the manufacturing materials to save materials, simplify manufacture, save time and reduce costs, and (9) contributing to wide promotion and application.

In order to achieve the purposes, the present invention is realized by following technical solutions.

An automobile neck pillow comprises a front plate, an upper plate, a back plate, a base plate, an elastic band, a core body, a left plate and a right plate, wherein a first side of the front plate and a first side of the upper plate, a second side of the upper plate and a first side of the back plate, a second side of the back plate and a first side of the base plate, a second side of the base plate and a second side of the front plate are respectively sewed together to form a cylindrical housing, the cylindrical housing is sleeved on and connected to the core body, wherein the front plate, the upper plate, the back plate and the base plate respectively has a left side thereof sewed with the left plate and a right side thereof sewed with the right plate, a left end of the elastic band is sewed with a left side of a bottom end of the back plate and a left side of an upper end of the base plate, and a right end of the elastic band is sewed with a right side of the bottom end of the back plate and a right side of the upper end of the base plate; thus the present invention mainly has following technical features.

(1) The core body is made of one member selected from the group consisting of a polyurethane foam material, a lowly resilient foam material, a highly resilient foam material, an ordinary foam material, a hollow-cotton material and a polyester wadding material.

(2) The core body is immersed into a medical liquid for health care to provide health care and healing to the neck; the medical liquid for health care is a filtrate through mixing, boiling and filtering 15 grams of *speranskia tuberculata*, 15 grams of *lycopodium clavatum,* 10 grams of argy wormwood leaf, 5 grams of safflower and 10 grams of ginger plate.

(3) The front plate, the upper plate, the back plate, the base plate, the left plate and the right plate are made of one member selected from the group consisting of genuine leather, leather, cloth and linen; the front plate, the upper plate, the back plate, the base plate, the left plate and the right plate are sprayed with one perfume selected from the group consisting of a rose essential oil, a jasmine essential oil and a lavender essential oil.

(4) An upper end of the back plate and an upper end of the upper plate simultaneously extend upwardly for 7 to 10 centimeters, and an upper end of the left plate and an upper end of the right plate extend upwardly correspondingly; a lower end of the front plate and a lower end of the base plate extend downwardly for 11 to 15 centimeters, and a lower end of the left plate and a lower end of the right plate extend downwardly correspondingly; the front plate, the upper plate, the back plate, the base plate, the left plate and the right plate are connected through sewing to form an elongated housing, and the core body and the elongated housing fit and match with each other.

(5) The core body and the elongated housing respectively has two sides of an upper end thereof bending upwardly to form an arc having a thickness of 1.5 to 2.0 centimeters, and two sides of a lower end thereof bending downwardly to form an arc having a thickness of 2.5 to 3.5 centimeters.

(6) The core body and the elongated housing has a longitudinal length of 37 to 46 centimeters and a transverse width of 29 to 35 centimeters, wherein a main part thereof has a thickness of 9 to 12 centimeters, and a thickness of the upwardly and downwardly extending parts of the main part reduces gradually.

(7) The core body is attached with a layer of one material selected from the group consisting of a bamboo charcoal fiber cushion, an infra-red cloth processed by infra-red radiation and a negative oxygen ion cloth processed by negative oxygen ions.

(8) The brace is provided correspondingly in the elongated housing.

(9) The elastic band is embodied as a longitudinal ribbon, a transverse ribbon, a combination of longitudinal ribbons and transverse ribbons, a head-sleeving fixation sleeve or an automobile head cushion.

(10) The automobile neck pillow is fixed between the seat and the head cushion in the automobile by one of following five fixation methods.

A. A longitudinal fixation. The longitudinal ribbon comprises an upper ribbon and a lower ribbon in the shape of ribbons, wherein an end of the upper ribbon and a central part of the upper end of the extended back plate, and an end of the lower ribbon and a central part of a lower end of the back plate are sewed to be connected, another end of the upper ribbon and another end of the lower ribbon are connected by one of nylon fasteners, snapping fasteners, couple inserting fasteners, belt buckles and hooks, in such a manner that the upper ribbon and the lower ribbon fix the automobile neck pillow between the seat and the head cushion in the automobile.

B. A transverse fixation. The transverse ribbon comprises two left ribbons and two right ribbons in the shape of ribbons, wherein the two left ribbons have one end respectively sewed and connected with a lower end and an upper end of the left side of the back plate, the two right ribbons have one end respectively sewed and connected with a lower end and an upper end of the right side of the back plate, another end of the left ribbons and another end of the right ribbons are connected by one of nylon fasteners, snapping fasteners, coupe inserting fasteners, belt buckles and hooks, in such a manner that the left ribbons and the right ribbons fix the automobile neck pillow between the seat and the head cushion in the automobile.

C. A combination of longitudinal and transverse fixation. By combining the longitudinal ribbons and the transverse ribbons, the automobile neck pillow is fixed between the seat and the head cushion in the automobile.

D. A head-sleeving fixation. A head-sleeving fixation sleeve, in the shape of a pocket to match with the head cushion of the automobile, is sewed on the back plate having an open end thereof facing downward and sleeved on the head cushion of the automobile, in such a manner that the automobile neck pillow is fixed between the seat and the head cushion in the automobile.

E. An integral fixation with the head cushion of the automobile. By making a corresponding head cushion of the automobile and combining the corresponding head cushion of the automobile and the automobile neck pillow into a whole to replace the original head cushion of the automobile, the automobile neck pillow having the corresponding head cushion is fixed between the seat and the head cushion in the automobile.

In the automobile neck pillow, the front plate, the upper plate, the back plate, the base plate, the left plate and the right plate are in a plate-like structure, and the core body is in a soft pillar structure having sections similar to parallelograms.

In the automobile neck pillow, the left side and the right side of the front plate have a length longer than that of the left side and the right side of the back plate, the left side and the right side of the upper plate have a length longer than that of the left side and the right side of the base plate.

In the automobile neck pillow, the front plate and the upper plate can be set into a whole as a component.

In the automobile neck pillow, the front plate, the upper plate, the back plate and the base plate form the cylindrical housing matching with the soft pillar of the core body.

Because the present invention adopts the provided technical solutions; because the present invention adopts the key technology truly adapted to physiological curves of human mechanics; because the present invention, based on the utility patent, makes a multiple choice about materials of the core body and the elongated housing and a scientific measurement about shapes and sizes thereof to have the core body and the elongated housing match with each other, wherein the core body is soaked in medical liquids of health care to provide health care and healing to the neck, the core body is attached with a bamboo charcoal fiber cushion, or an infra-red cloth, or a negative oxygen ion cloth while integrally being sprayed with perfume, a brace provided in the elongated housing is mounted between the seat and the head cushion by one way of the longitudinal fixation, the transverse fixation, the combination of longitudinal and transverse fixation, the on-sleeving fixation and the integral fixation with the head cushion, the present invention has following benefits.

1. Adopting the key technology truly adapted to the physiological curves of human mechanics, efficiently improving the foregoing patented technology so as to produce the present invention, providing a new product of an automobile neck pillow and making a great technological progress as a good company for drivers, and serving the drivers better;

2. Installing the present invention between the upper end of the seat and the head cushion through the various installing methods to suit different types of automobiles, offering customers multi choices to satisfy customers' different needs, providing easiness, readiness, saving time, saving energies, high efficiency and stable and reliable effects to customers in the process of using, cleaning and maintaining since the present invention can be easily installed, applied, cleaned and maintained;

3. Allowing the drivers to drive comfortably and be free from stiffness and ache in the neck, providing obvious health care and protecting the neck in collision so as to provide safe and reliable precaution and maintenance with stable effects to drivers in driving;

4. Having the core body of the present invention made of soft materials chosen from several materials, which can be used directly and also after being immersed in the medical liquids for health care, no matter whether the drivers have neck sickness or not, providing health care to the neck and reducing an incidence of neck sickness if the drivers have no neck sickness, and providing health care and healing to the neck if the drivers have neck sickness, so as to effectively protect the neck, reduce driving fatigue and turn the driving into a pleasure.

5. When the core body of the present invention is immersed in the medical liquids for health care, using a medical liquid for health care made of Chinese medicine, which is a filtrate through mixing, boiling and filtering 15 grams of *speranskia tuberculata,* 15 grams of *lycopodium clavatum,* 10 grams of argy wormwood leaf, 5 grams of safflower and 10 grams of ginger plate, wherein the *speranskia tuberculata* is neutral in nature for expelling rheumatism, invigorating the circulation of blood and relieving pain, the *lycopodium clacatum* is warm in nature for expelling pathogenic wind to remove dampness and relaxing muscles and tendons, the argy wormwood leaf is warm in nature for dispersing cold to ease pain and warming the channels to stop bleeding, the safflower is warm in nature for promoting blood circulation to relax muscles and tendons and dispersing blood coagulation to relieve pain, and the ginger plate is hot in nature for warming the middle-jiao to disperse cold, reviving yang to promote blood circulation and drying dampness to eliminate phlegm; wherein the Chinese medicine functions as an organized integrity, comprising functions of expelling pathogenic wind to remove dampness, relaxing muscles and tendons, promoting blood circulation to relax muscles and tendons, promoting blood circulation, reviving yang to promote blood circulation, dispersing cold to ease pain and dispersing blood coagulation to relieve pain, and provides health care and healing to drivers in the process of gradually releasing through a medium of the core body.

6. Spraying the integral present invention with one perfume of the rose essential oil, the jasmine essential oil and the lavender essential oil to provide a fragrant driving environment for the drivers to feel fresh and relaxed.

7. Attaching the core body with the bamboo charcoal fiber cushion, which is for absorbing moisture, eliminating peculiar smells, expelling parasites and improving air quality; attaching the core body with the infra-red cloth or the negative oxygen ion cloth which are for improving air quality, so as to improve the air quality in a driving cab for the driver to feel more comfortable.

8. As the present invention is novel in designing and advanced in technology, through repeated researches, trials and improvements, setting all measurements about the automobile neck pillow, such as the shape and size thereof, to give the present invention a scientific and reasonable designing, a simple and ingenious structure, a rapid and easy application and a stable and reliable effect, which is a superior investment the drivers should be proud of rather than any trouble or burden brought to drivers.

9. Making a multiple choice about the manufacturing materials, and choosing whatever material to save materials, simplify manufacture, save time and reduce costs.

10. As a conclusion, having a great potential in markets, which attracts drivers to use the present invention and provides automobile manufactures room for improving and producing, and having values for wide promotion and application.

Furthermore, to be more specific, the present invention has following instinct progress and features. (1) Good for human health; the present invention effectively maintains physiological curves of human body during being used and bears the head, so as to reduce the pressure of the head on the neck; the core body of the present invention is made of soft materials to provide softness all the time, which avoids stiffness and aches in the neck caused by driving for a long time. (2) Providing comfort; as stated previously, the present invention effectively maintains physiological curves of human body, in such a manner that the drivers feel comfortable to be free from fatigue in the whole driving process. (3) Providing pleasure; in the process of driving, the present invention offers drivers a chance for have a break, on which slightly leaning the head reveals softness thereof fully to give drivers effectively relaxing and comfort. (4) Effectively adding safety factor of driving; in driving process, if other vehicles collide with the automobile, the feature of softness of the present invention is revealed more at the instant of colliding, when the present invention efficiently absorbs the impact force the neck bears, avoids injuring the neck caused by vehicle collision, protects the neck of the driver and effectively add the safety factor of driving. (5) Curing sickness and providing health care. The core body is immersed in the medical liquids for health care to realize a beneficial goal of curing sickness and providing health care. (6) Convenience in installing, using, cleaning and maintaining. When installing, whatever installing method, which is chosen from the several installing methods of the present invention, can install the present invention between the upper end of the seat and the head cushion in the automobile; when using, the neck is naturally leaned against the present invention with an experience of softness; when cleaning, the present invention could be cleaned by materials like foam or cotton cloth dipping with little cleaning solution through wiping, or by washing machine; it is much easier with maintaining, and basically the present invention requires no special maintenance except using and cleaning. (7) Filling the blank of the seat in the automobile driving cab without automobile neck pillow. The present invention truly adapts to physiological curves of human mechanics and turns out to be more comfortable, more humanized, more convenient and more beautiful and elegant based on greatly improving technical level.

BRIEF DESCRIPTION OF THE DRAWINGS

FIG. 1 shows a preferred embodiment of the present invention, i.e., a section view of a head-sleeving fixation; based on the preferred embodiment, the present invention has more preferred embodiments. In FIG. 1, a head-sleeving fixation sleeve is a partially revealed object in a shape of a pocket connected to a back plate at a top left corner, i.e., fixation by sleeving on; the present invention can adopts a longitudinal fixation, a transverse fixation, a combination of longitudinal and transverse fixations, or an integral fixation with a head cushion in the automobile according to practical needs; in FIG. 1, a brace sticks closely to an inner wall of an elongated housing matching with the elongated housing, and the present invention can be provided with or without the brace.

1—the front plate; 2—the upper plate; 3—the back plate; 4—the base plate; 5—the elastic band; 6—the core body; 7—the left plate.

DETAILED DESCRIPTION OF THE PREFERRED EMBODIMENT

A First Preferred Embodiment

Figure 1:
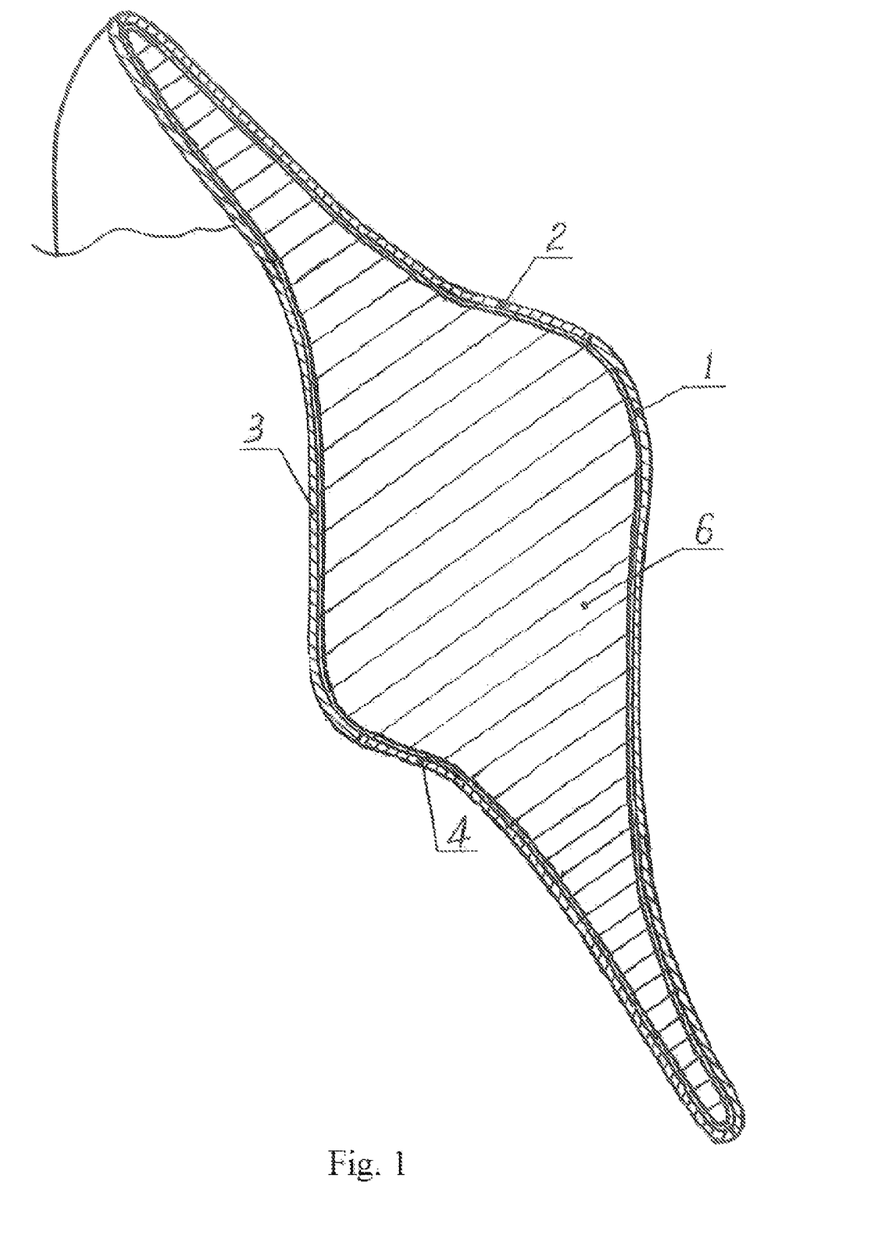
FIG. 1 is a section view of the present invention according to a preferred embodiment of the present invention.
Figure 2:
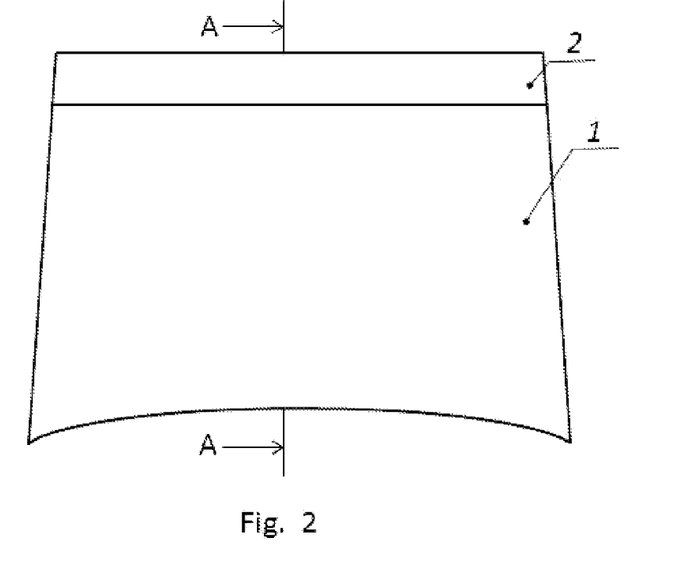
FIG. 2 is a front view of the prior invention, as a comparison drawing to deepen understanding of the present invention.
Figure 3:
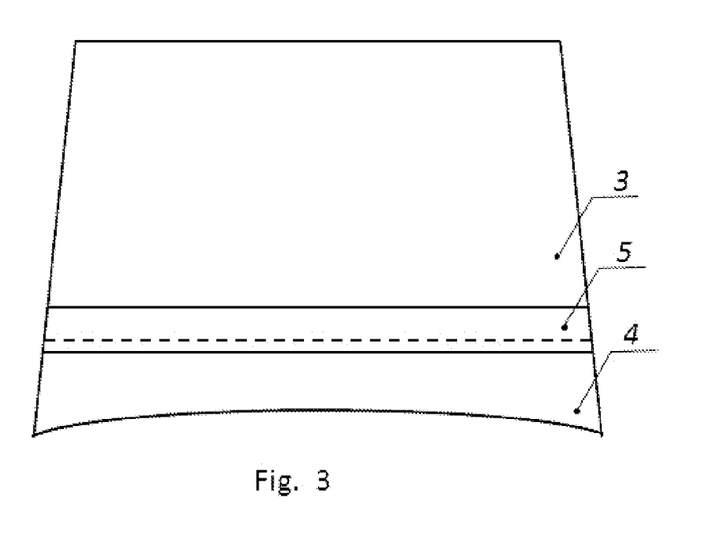
FIG. 3 is a back view of the prior invention, as a comparison drawing to deepen understanding of the present invention.
Figure 4:
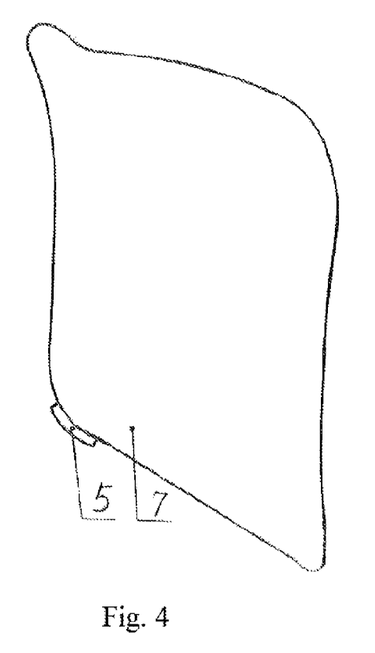
FIG. 4 is an enlarged left view of the prior invention, as a comparison drawing to deepen understanding of the present invention.
Figure 5:
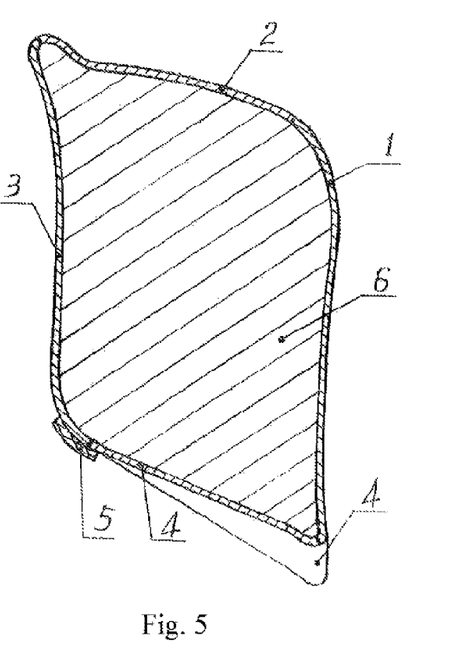
FIG. 5 is an enlarged view of FIG. 2 at an A-A direction, as a comparison drawing to deepen understanding of the present invention.

Combined with figures in the specification, detailed illustration of the present invention is following. As is shown in FIG. 1 (referring to FIG. 2, FIG. 3, FIG. 4 and FIG. 5), An automobile neck pillow comprises a front plate 1, an upper plate 2, a back plate 3, a base plate 4, an elastic band 5, a core body 6, a left plate 7 and a right plate; a side of the front plate 1 and a side of the upper plate 2, another side of the upper plate 2 and a side of the back plate 3, another side of the back plate 3 and a side of the base plate 4, another side of the base plate 4 and another side of the front plate 1 are connected through sewing to form a cylindrical housing, wherein the cylindrical housing is connected to the core body 6 by sleeving on, the front plate 1, the upper plate 2, the back plate 3 and the base plate 4 respectively has a left side connected with the left plate 7 and a right side connected with the right plate by sewing, a left end of the elastic band 5 is sewed with a left side of a bottom end of the back plate 3 and a left side of an upper end of the base plate 4, and a right end of the elastic band 5 is sewed with a right side of the bottom end of the back plate 3 and a right side of the upper end of the base plate 4; thus the present invention has following obvious, key, novel and beneficial technical features.

(1) The core body 6 is made of one member selected from the group consisting of a polyurethane foam material, a lowly resilient foam material, a highly resilient foam material, an ordinary foam material, a hollow-cotton material and a polyester wadding material.

(2) The core body 6 is immersed into a medical liquid for health care to provide health care and healing to the neck; the medical liquid for health care is a filtrate through mixing, boiling and filtering 15 grams of *speranskia tuberculata*, 15 grams of *lycopodium clavatum*, 10 grams of argy wormwood leaf, 5 grams of safflower and 10 grams of ginger plate.

(3) The front plate 1, the upper plate 2, the back plate 3, the base plate 4, the left plate 7 and the right plate are made of one member selected from the group consisting of genuine leather, leather, cloth and linen; the front plate 1, the upper plate 2, the back plate 3, the base plate 4, the left plate 7 and the right plate are sprayed with one perfume selected from the group consisting of a rose essential oil, a jasmine essential oil and a lavender essential oil.

(4) An upper end of the back plate 3 and an upper end of the upper plate 2 simultaneously extend upwardly for 7 to 10 centimeters, and an upper end of the left plate 7 and an upper end of the right plate extend upwardly correspondingly; a lower end of the front plate 1 and a lower end of the base plate 4 simultaneously extend downwardly for 11 to 15 centimeters, and a lower end of the left plate 7 and a lower end of the right plate extend downwardly correspondingly; the front plate 1, the upper plate 2, the back plate 3, the base plate 4, the left plate 7 and the right plate are connected through sewing to form an elongated housing, and the core body 6 and the elongated housing fit and match with each other.

(5) The core body 6 and the elongated housing respectively has two sides of an upper end thereof bending upwardly to form an arc having a thickness of 1.5 to 2.0 centimeters, and two sides of a lower end thereof bending downwardly to form an arc having a thickness of 2.5 to 3.5 centimeters.

(6) The core body 6 and the elongated housing has a longitudinal length of 37 to 46 centimeters and a transverse width of 29 to 35 centimeters, wherein a main part thereof has a thickness of 9 to 12 centimeters, and a thickness of the upwardly and downwardly extending parts of the main part reduces gradually.

(7) The core body 6 is attached with a layer of one material selected from the group consisting of a bamboo charcoal fiber cushion, an infra-red cloth processed by infra-red radiation and a negative oxygen ion cloth processed by negative oxygen ions.

(8) The brace is provided correspondingly in the elongated housing.

(9) The elastic band 5 is embodied as a longitudinal ribbon, a transverse ribbon, a combination of longitudinal ribbons and transverse ribbons, a head-sleeving fixation sleeve or an automobile head cushion.

(10) The automobile neck pillow is fixed between the seat and the head cushion in the automobile by one of following five fixation methods.

A. A longitudinal fixation. The longitudinal ribbon comprises an upper ribbon and a lower ribbon in the shape of ribbons, wherein an end of the upper ribbon and a central part of the upper end of the extended back plate, and an end of the lower ribbon and a central part of a lower end of the back plate are sewed to be connected, another end of the upper ribbon and another end of the lower ribbon are connected by one of nylon fasteners, snapping fasteners, couple inserting fasteners, belt buckles and hooks, in such a manner that the upper ribbon and the lower ribbon fix the automobile neck pillow between the seat and the head cushion in the automobile.

B. A transverse fixation. The transverse ribbon comprises two left ribbons and two right ribbons in the shape of ribbons, wherein the two left ribbons have one end respectively sewed and connected with a lower end and an upper end of the left side of the back plate 3, the two right ribbons have one end respectively sewed and connected with a lower end and an upper end of the right side of the back plate 3, another end of the left ribbons and another end of the right ribbons are connected by one of nylon fasteners, snapping fasteners, coupe inserting fasteners, belt buckles and hooks, in such a manner that the left ribbons and the right ribbons fix the automobile neck pillow between the seat and the head cushion in the automobile.

C. A combination of longitudinal and transverse fixation. By combining the longitudinal ribbons and the transverse ribbons, the automobile neck pillow is fixed between the seat and the head cushion in the automobile.

D. A head-sleeving fixation. A head-sleeving fixation sleeve, in the shape of a pocket to match with the head cushion of the automobile, is sewed on the back plate 3 having an open end thereof facing downward and sleeved on the head cushion of the automobile, in such a manner that the automobile neck pillow is fixed between the seat and the head cushion in the automobile.

E. An integral fixation with the head cushion of the automobile. By making a corresponding head cushion of the automobile and combining the corresponding head cushion of the automobile and the automobile neck pillow into a whole to replace the original head cushion of the automobile, the automobile neck pillow having the corresponding head cushion is fixed between the seat and the head cushion in the automobile.

In the automobile neck pillow, the front plate 1, the upper plate 2, the back plate 3, the base plate 4, the left plate 7 and the right plate are in a plate-like structure, and the core body 6 is in a soft pillar structure having sections similar to parallelograms.

In the automobile neck pillow, the left side and the right side of the front plate 1 have a length longer than that of the left side and the right side of the back plate 3, the left side and the right side of the upper plate 2 have a length longer than that of the left side and the right side of the base plate 4.

In the automobile neck pillow, the front plate 1 and the upper plate 2 can be set into a whole as a component.

In the automobile neck pillow, the front plate 1, the upper plate 2, the back plate 3 and the base plate 4 form the cylindrical housing matching with the soft pillar of the core body 6.

According to the preferred embodiment of the present invention, the front plate 1 and the upper plate 2 are embodied as two respective components, and also as an integral component; the core body 6 is embodied as being made of the polyurethane foam material, the lowly resilient foam material, the highly resilient foam material, the ordinary foam material, the a hollow-cotton material and the polyester wadding material; the core body 6 is embodied as being and without being immersed by the medical liquids for health care; the front plate 1, the upper plate 2, the back plate 3, the base plate 4, the left plate 7 and the right plate are respectively embodied as being made of genuine leather, leather, cloth and linen; the front plate 1, the upper plate 2, the back plate 3, the base plate 4, the left plate 7 and the right plate are embodied as being sprayed with the rose essential oil, the jasmine essential oil and the lavender essential oil; the upper end of the back plate 3 and the upper end of the upper plate 2 are respectively embodied as simultaneously extending upwardly 7, 8, 9 and 10 centimeters, and the upper end of the left plate 7 and the upper end of the right plate are embodied as correspondingly extending upwardly; the lower end of the front plate 1 and the lower end of the base plate 4 are respectively embodied as simultaneously extending downwardly 11, 12, 13, 14 and 15 centimeters, and the lower end of the left plate 7 and the lower end of the right plate are embodied as correspondingly extending downwardly; the core body 6 and the elongated housing respectively has the two sides of the upper end thereof bending upwardly to form an arc respectively embodied as having a thickness of 1.5, 1.6, 1.7, 1.8, 1.9 and 2.0 centimeters, and the two sides of the lower end thereof bending downwardly to form an arc respectively embodied as having a thickness of 2.5, 2.6, 2.7, 2.8, 2.9, 3.0, 3.1, 3.2, 3.3, 3.4 and 3.5 centimeters; the core body 6 and the elongated housing has a longitudinal length respectively embodied as 37, 38, 39, 40, 41, 42, 43, 44, 45 and 46 centimeters and a transverse width respectively embodied as 29, 30, 31, 32, 33, 34 and 35 centimeters, wherein a main part thereof has a thickness respectively embodied as 9, 10, 11 and 12 centimeters; the core body 6 is attached with a layer embodied as the bamboo charcoal fiber cushion, the infra-red cloth processed by infra-red radiation and the negative oxygen ion cloth processed by negative oxygen ions; the elongated housing is embodied as being provided with and without the brace; the elastic band 5 is respectively embodied as the longitudinal ribbon, the transverse ribbon, the combination of longitudinal ribbons and transverse ribbons, the on-sleeving fixation sleeve and the automobile head cushion; the automobile neck pillow is fixed between the seat and the head cushion in the automobile by the fixation method embodied as the longitudinal fixation, the transverse fixation, the combination of longitudinal fixation and transverse fixation, the on-sleeving fixation and the integral fixation with the head cushion in the automobile; expected good results are all achieved.

A Second Preferred Embodiment

The second preferred embodiment is embodied as the first preferred embodiment, particularly, the core body 6 is embodied as being immersed by the medical liquids for health care. Expected good results are achieved.

A Third Preferred Embodiment

The third preferred embodiment is embodied as the first preferred embodiment, particularly, the core body 6 is embodied as not being immersed by the medical liquids for health care. Similarly, expected good results are achieved.

A Fourth Preferred Embodiment

The fourth preferred embodiment is embodied as the first preferred embodiment, but the elongated housing is embodied as being provided with the corresponding brace. Expected good results are achieved.

A Fifth Preferred Embodiment

The fifth preferred embodiment is embodied as the first preferred embodiment, but the elongated housing is embodied as being provided without the corresponding brace. Similarly, expected good results are achieved.

A Sixth Preferred Embodiment

The sixth preferred embodiment is embodied as the first preferred embodiment, but the automobile neck pillow is fixed between the seat and the head cushion in the automobile by the fixation method embodied as the longitudinal fixation. Expected good results are achieved.

A Seventh Preferred Embodiment

The seventh preferred embodiment is embodied as the first preferred embodiment, but the automobile neck pillow is fixed between the seat and the head cushion in the automobile by the fixation method embodied as the transverse fixation. Similarly, expected good results are achieved.

An Eighth Preferred Embodiment

The eighth preferred embodiment is embodied as the first preferred embodiment, but the automobile neck pillow is fixed between the seat and the head cushion in the automobile by the fixation method embodied as the combination of longitudinal fixation and transverse fixation. Similarly, expected good results are achieved.

A Ninth Preferred Embodiment

The ninth preferred embodiment is embodied as the first preferred embodiment, but the automobile neck pillow is fixed between the seat and the head cushion in the automobile by the fixation method embodied as the on-sleeving fixation. Similarly, expected good results are achieved.

A Tenth Preferred Embodiment

The tenth preferred embodiment is embodied as the first preferred embodiment, but the automobile neck pillow is fixed between the seat and the head cushion in the automobile by the fixation method embodied as the integral fixation with the head cushion in the automobile. Similarly, expected good results are achieved.

An Eleventh Preferred Embodiment

The eleventh preferred embodiment is embodied as the first preferred embodiment, but the front plate 1 and the upper plate 2 are embodied as being set into an integrity to become a whole component. Similarly, expected good results are achieved.

Through the preferred embodiment from the first to the eleventh, the present invention is put on trials, i.e., being tested by different drivers and estimated in applications, wherein the functions of health care and healing on the neck provided by the core body 6 immersed by the medical liquids for health care are especially rated. For example, 1. Mr. Li, 22, from Beijing, estimates the automobile neck pillow of the present invention good after trial.

2. Ms. Wang, 20 years old, from Beijing, is especially satisfied with the automobile neck pillow of the present invention after trial.

3. Mr. Zhao, 58 years old, from Beijing, estimates the automobile neck pillow of the present invention good after trial and requires promotion as quick as possible.

4. Ms. Zhang, 49 years old, from Beijing, is extremely satisfied with the automobile neck pillow of the present invention after trial and requires another pillow for her friend to try.

5. Mr. Su, 25 years old, from Fuzhou, is especially satisfied with the automobile neck pillow of the present invention after trial and thinks that the automobile neck pillow should be recommended to automobile manufacturers and put on markets as soon as possible.

6. Ms. Tian, 26 years old, from Chengdu, estimates the automobile neck pillow of the present invention good after trial and requires purchasing.

7. Mr. Liu, 55 years old, from Wuhan, estimates the automobile neck pillow of the present invention the best after trial.

8. Ms. Liang, 50 years old, from Changsha, estimates the automobile neck pillow of the present invention good after trial.

9. Mr. Sun, 42 years old, from Shanghai, estimates the automobile neck pillow of the present invention very good and especially comfortable after trial and thinks that the automobile neck pillow of the present invention should be produced as soon as possible.

10. Mr. Si, 20 years old, from Harbin, estimates the automobile neck pillow of the present invention good and feels especially satisfied after trial.

11. Ms. Lu, 20 years old, from Changchun, is especially satisfied with the automobile neck pillow of the present invention after trial.

12. Mr. Li, 62 years old, from Dandong, estimates the automobile neck pillow of the present invention good and feels especially satisfied after trial and suggests promoting overseas.

13. Mr. Yang, 45 years old, from Hohhot, estimates the automobile neck pillow of the present invention good and feels especially satisfied after trial and suggests applying for patent as soon as possible.

14. Mr. Jia, 40 years old, from Lhasa, is especially satisfied with the automobile neck pillow of the present invention after trial and suggests production as soon as possible.

15. Mr. Du, 42 years old, from Urumqi, is especially satisfied with the automobile neck pillow of the present invention after trial.

16. Ms. Duan, 32 years old, from Tianjin, estimates the automobile neck pillow of the present invention good and feels especially satisfied after trial.

17. Ms. Chang, 38 years old, from Taiyuan, estimates the automobile neck pillow of the present invention good and feels especially satisfied after trial and suggests cooperating with automobile manufacturers in producing.

18. Ms. Ma, 46 years old, from Xi'an, is especially satisfied with the automobile neck pillow of the present invention after trial and requires producing as quickly as possible.

19. Mr. Zhang, 28 years old, from Shijiazhuang, estimates the automobile neck pillow of the present invention very good and feels especially satisfied after trial.

Here leaves out more examples without being stated one by one.

Through trials, no matter whether the core body 6 is immersed with the medical liquids for health care or not, the present invention reaps expected good results free from the limitations of regions, ages and genders.

One skilled in the art will understand that the embodiment of the present invention as shown in the drawings and described above is exemplary only and not intended to be limiting. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An automobile neck pillow, comprising a front plate, an upper plate, a back plate, a base plate, an elastic band, a core body, a left plate and a right plate, wherein a side of said front plate and a side of said upper plate, another side of said upper plate and a side of said back plate, another side of said back plate and a side of said base plate, another side of said base plate and another side of said front plate are connected through sewing to form a cylindrical housing which is connected to said core body through sleeving on, wherein said front plate, said upper plate, said back plate and said base plate respectively has a left side thereof connected with said left plate and a right side thereof connected with said right plate through sewing, and said elastic band has a left end thereof connected by sewing with a left side of a bottom end of said back plate and a left side of an upper end of said base plate and a right end thereof connected by sewing with a right side of said bottom end of said back plate and a right side of said upper end of said base plate; characterized in that:

(1) said core body is made of one material selected from the group consisting of a polyurethane foam material, a lowly resilient foam material, a highly resilient foam material, an ordinary foam material, a hollow-cotton material and a polyester wadding material;

(2) said core body is immersed into a medical liquid for health care to provide health care and healing to a neck; said medical liquid for health care is a filtrate through mixing, boiling and filtering 15 grams of speranskia tuberculata, 15 grams of lycopodium clavatum, 10 grams of argy wormwood leaf, 5 grams of safflower and 10 grams of ginger plate;

(3) said front plate, said upper plate, said back plate, said base plate, said left plate and said right plate are made of one material selected from the group consisting of genuine leather, leather, cloth and linen; said front plate, said upper plate, said back plate, said base plate, said left plate and said right plate are sprayed with one perfume of a rose essential oil, a jasmine essential oil and a lavender essential oil;

(4) an upper end of said back plate and an upper end of said upper plate simultaneously extend upwardly for 7 to 10 centimeters relative to said core body, and an upper end of said left plate and an upper end of said right plate correspondingly extend upwardly; a lower end of said front plate and a lower end of said base plate simultaneously extend downwardly for 11 to 15 centimeters relative to said core body, and a lower end of said left plate and a lower end of said right plate correspondingly extend downwardly; said front plate, said upper plate, said back plate, said base plate, said left plate and said right plate are connected through sewing to form an elongated housing, and said core body and said elongated housing fit and match with each other;

(5) said core body and said elongated housing respectively has two sides of an upper end thereof bending upwardly to form an arc having a thickness of 1.5 to 2.0 centimeters, and two sides of a lower end thereof bending downwardly to form an arc having a thickness of 2.5 to 3.5 centimeters;

(6) said core body and said elongated housing have a longitudinal length of 37 to 46 centimeters and a transverse width of 29 to 35 centimeters, wherein a main part thereof has a thickness of 9 to 12 centimeters, and a thickness of the upwardly and downwardly extending parts of said main part reduces gradually;

(7) said core body is attached with a layer of one material selected from the group consisting of a bamboo charcoal fiber cushion, an infra-red cloth processed by infra-red radiation and a negative oxygen ion cloth processed by negative oxygen ions; and (8) said automobile neck pillow is for being fixed between a seat and a head cushion of an automobile by a manner of an integral fixation with the head cushion of the automobile.

2. The automobile neck pillow, as recited in claim 1, characterized in that said front plate, said upper plate, said back plate, said base plate, said left plate and said right plate are all plate-like and said core body is in a structure of a soft pillar having sections similar to parallelograms.

3. The automobile neck pillow, as recited in claim 1, characterized in that said left side and said right side of said front plate have a length longer than that of said left side and said right side of said back plate, and said left side and said right side of said upper plate have a length longer than that of said left side and said right side of said base plate.

4. The automobile neck pillow, as recited in claim 2, characterized in that said left side and said right side of said front plate have a length longer than that of said left side and said right side of said back plate, and said left side and said right side of said upper plate have a length longer than that of said left side and said right side of said base plate.

5. The automobile neck pillow, as recited in claim 1, characterized in that said front plate and said upper plate are integrated.

6. The automobile neck pillow, as recited in claim 2, characterized in that said front plate and said upper plate are integrated.

7. The automobile neck pillow, as recited in claim 3, characterized in that said front plate and said upper plate are integrated.

8. The automobile neck pillow, as recited in claim 4, characterized in that said front plate and said upper plate are integrated.

9. The automobile neck pillow, as recited in claim 2, characterized in that said front plate, said upper plate, said back plate and said base plate form a cylindrical housing corresponding with said soft pillar of said core body.

10. The automobile neck pillow, as recited in claim 4, characterized in that said front plate, said upper plate, said back plate and said base plate form a cylindrical housing corresponding with said soft pillar of said core body.

11. The automobile neck pillow, as recited in claim 6, characterized in that said front plate, said upper plate, said back plate and said base plate form a cylindrical housing corresponding with said soft pillar of said core body.

12. The automobile neck pillow, as recited in claim 8, characterized in that said front plate, said upper plate, said back plate and said base plate form a cylindrical housing corresponding with said soft pillar of said core body.

* * * * *